(12) United States Patent
Sugiura

(10) Patent No.: US 6,880,884 B2
(45) Date of Patent: Apr. 19, 2005

(54) VEHICLE SUNROOF STRUCTURE

(75) Inventor: Takumi Sugiura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/671,247

(22) Filed: Sep. 24, 2003

(65) Prior Publication Data

US 2004/0061360 A1 Apr. 1, 2004

(30) Foreign Application Priority Data

Sep. 27, 2002 (JP) .......................................... 2002-283829

(51) Int. Cl.[7] .................................................. B60J 7/00
(52) U.S. Cl. .................... 296/216.08; 296/213; 296/214
(58) Field of Search ................................. 296/213, 214, 296/216.08, 216.04

(56) References Cited

U.S. PATENT DOCUMENTS 5,558,394 A   9/1996   Mori et al.
5,709,427 A * 1/1998   Farber et al. ............... 296/214
5,906,412 A   5/1999   Matsumura
6,604,782 B1 * 8/2003   De Gaillard et al. ... 296/216.04

FOREIGN PATENT DOCUMENTS

| DE | 199 40 519 C1 | 2/2001 |
| EP | 0 547 375 A2 | 6/1993 |
| JP | 02-035536 A1 | 2/1990 |
| JP | Y2-02-035536 | 9/1990 |

* cited by examiner

Primary Examiner—Dennis H. Pedder
(74) Attorney, Agent, or Firm—Darby & Darby

(57) ABSTRACT

In a vehicle sunroof structure having lid sliding rails formed on left and right sides respectively of a roof opening in such a way as to extend longitudinally so as to guide sunroof lids, and also having shade sliding rails respectively formed on the left and right sides of the roof opening in such a manner as to extend longitudinally, lid forming members, on which the lid sliding rails are respectively formed, is provided separately from shade forming members on which the shade sliding rails are respectively formed so as to drastically enlarge the design freedom of the sunroof structure for widening the passenger compartment.

9 Claims, 5 Drawing Sheets

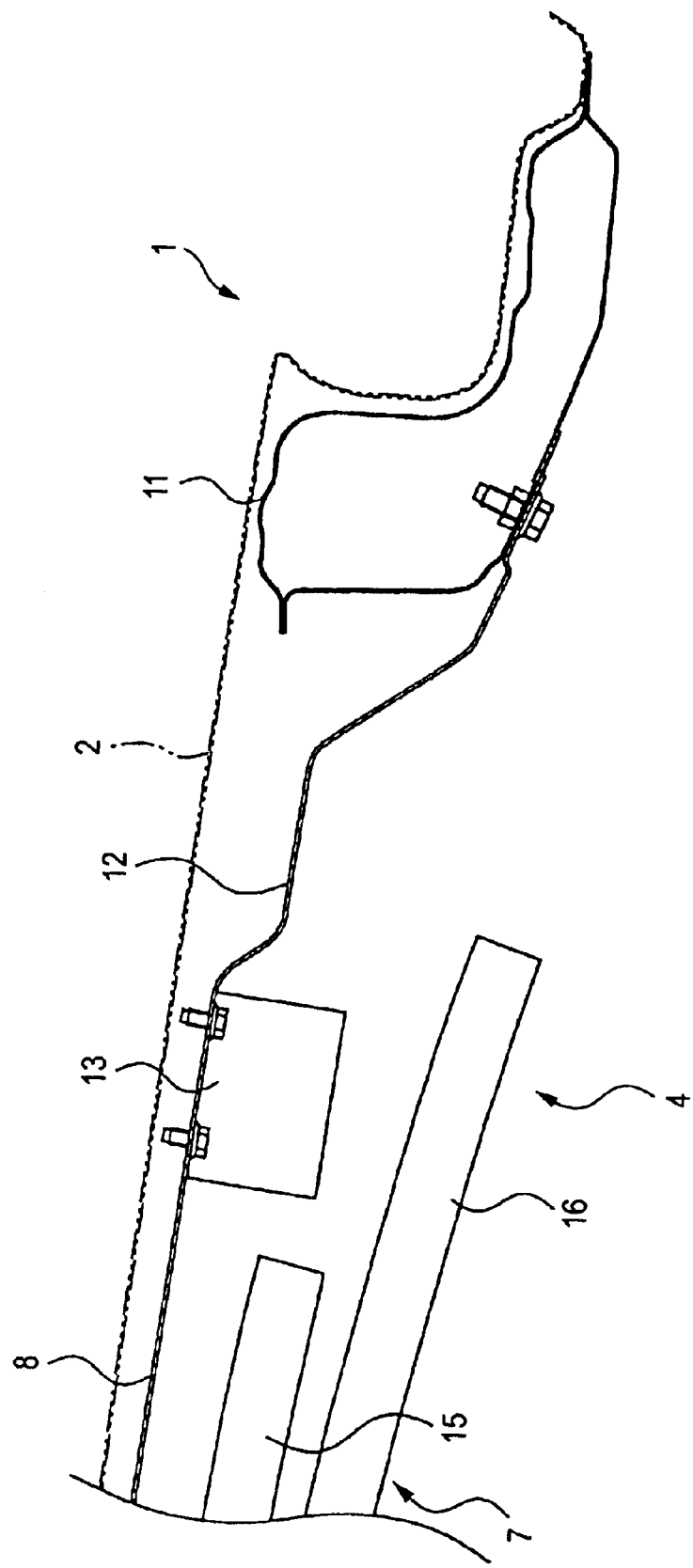

VEHICLE SUNROOF STRUCTURE

BACKGROUND OF THE INVENTION

The present invention relates to a vehicle sunroof structure having lid sliding rails for guiding a sunroof lid and shade sliding rails for guiding a sunshade.

Hitherto, there is known such a kind of the sunroof structure having a pair of left and right frame portions respectively extending forwardly and rearwardly on left and right peripheral edge portions of a roof opening. Lid sliding rails for guiding the sunroof lid are respectively formed in left and right outer parts of each of frame portions. Shade sliding rails for guiding the sunroof lid are respectively formed in left and right inner parts of each of the frame portions (see Patent Document 1 (to be described later)). A drain groove is also formed in each of the frame portions. The lid sliding rail, the shade sliding rail, and the drain groove are integrally formed in each of the frame portions.

The sunroof lid engages with a drive member, which is guided by the lid sliding rail and moves in a longitudinal direction of a vehicle, in a predetermined zone of the rail. A movement of the engaged drive member causes the sunroof lid to open and close the roof opening.

[Patent Document 1]

The Examined Japanese Utility Model Application Publication No. Hei2-35536 also is formed with a lid and shade sliding rail.

Meanwhile, in this sunroof structure, the lid sliding rail and the shade sliding rail are integrally formed. Thus, moving loci of the drive member and the shade respectively moved by the sliding rails are nearly the same.

Incidentally and preferably, the drive member follows a locus of which radius of a curvature varies according to an engagement state between the drive member and the sunroof lid. Especially, in the case that the sunroof lid is divided into front and rear sunroof lid portions, which are separately driven, it is necessary to configure the sunroof structure so that the drive member follows the locus of which radii or centers of the curvature respectively corresponding to an engaging zone, in which the drive member engages with the front sunroof lid portion, and another engaging zone, in which the drive member engages with the rear sunroof lid portion, differ from each other.

Further, because the sunshade is operated by a passenger, it is preferable that a force for performing a moving operation of the sunshade is almost constant in forward and rearward directions, and that the sunshade follows the locus of which radius of the curvature is nearly constant in both forward and rearward directions.

However, in the aforementioned sunroof structure, the sliding rails are integrally formed. Thus, the radii of the curvature of the sliding rails cannot individually be set. Therefore, the vehicle sunroof structure has a problem in that the vehicle sunroof structure cannot meet all the aforementioned requirements.

Moreover, the sunroof lid should be provided in such a way as to be integral with a roof panel by simultaneously closing the roof opening of the vehicle. Furthermore, it is necessary to provide the sunshade in such a manner as to cause a sense of unity (i.e., feeling like one component). However, in the sunroof structure, the sliding rails are integrally formed. This constrains an arrangement state of the sunroof lid and the sunshade. Therefore, the sunroof structure has the problem in that the flexibility in forming the exterior and interior of the vehicle is limited so as to provide the sunroof lid and the sunshade in the vehicle in such a way as not to impair the exterior and interior of the roof and surroundings thereof, as described above. Furthermore, an unused space is created between the roof panel and the roof trim, resulting in the inconvenience that a large living space for occupants cannot be ensured.

SUMMARY OF THE INVENTION

The present invention is accomplished in view of aforementioned circumstances. Accordingly, an object of the invention is to provide a vehicle sunroof structure that increases a flexibility in designing an exterior and an interior of the roof and surroundings of a vehicle.

To achieve the foregoing object, according to the invention, there is provided a vehicle sunroof structure (hereunder referred to as a first vehicle sunroof structure of the invention) having lid sliding rails respectively formed on left and right sides of a roof opening in such a way as to extend forwardly and rearwardly so as to guide sunroof lids, and also having shade sliding rails respectively formed on the left and right sides of the roof opening in such a manner as to extend in a longitudinal direction of a vehicle. In this structure, each of lid forming members, on which the lid sliding rails are respectively formed, is provided independently from shade forming members on which the shade sliding rails are respectively formed.

According to the first sunroof structure of the invention, each of the lid forming members is provided independently from the shade forming members. Thus, each of the lid sliding rails is formed separately. The sunroof lids and the sunshade can be disposed corresponding to an installed state and the formed state of a roof panel and a roof trim. Consequently, even when the roof panel and the roof trim are formed separately by emphasizing a marketability of the vehicle, the sunroof lid and the sunshade can be disposed without impairing a sense of unity of the exterior and interior of the vehicle.

Therefore, the flexibility in forming the vehicle roof and surroundings thereof is drastically improved. Also, the marketability of the vehicle is drastically improved. Further, the roof panel and a roof trim can be installed so that a gap therebetween is small. The roof trim can become close to the roof panel within a range in which the sunroof structure does not interfere a sunroof function. Consequently, a space in a vehicle interior can be increased.

According to an embodiment (hereunder referred to as a second sunroof structure of the invention) of the first sunroof structure of the invention, the lid sliding rails and the shade sliding rails are respectively formed on loci that differ from one another.

The second sunroof structure has the following effects in addition to those of the first sunroof structure. That is, each of the lid sliding rails can be formed on loci determined by a size, a shape, an opening method of the sunroof lid, and the shape of the roof panel. Moreover, each of the shade sliding rails can be formed on the locus determined according to a force applied by the occupant for moving the sunshade and a shape of the roof trim. That is, in the case that the loci are nearly the same, it is difficult to design the loci independently. However, according to the invention, the loci respectively corresponding to the sliding rails can be designed in an optimum condition.

Therefore, each of the sliding rails can be adapted to any forming methods of the roof and surroundings of the vehicle, and to any driving and operating states of the sunroof lid and the sunshade. Consequently, the marketability of the vehicle can be more improved.

In the embodiment (hereunder referred to as a third vehicle sunroof structure of the invention) of the second sunroof structure of the invention, each of the lid sliding rails and the shade sliding rails is formed by being bent in such a way as to be upwardly convex. Further, each of the shade sliding rails is formed in such a manner as to have a nearly constant radius of a curvature.

The third vehicle sunroof structure of the invention has the following effects in addition to those of the second sunroof structure. That is, because each of the shade sliding rails has the nearly constant radius of the curvature, the force for moving the sunshade can be made to be nearly constant in the longitudinal direction of the vehicle.

Therefore, needless to say, the sunshade can stably be moved in the longitudinal direction. Occupants do not have uncomfortable feelings for operating the sunshade. The marketability of the vehicle can be more enhanced.

According to the embodiment (hereunder referred to as a fourth sunroof structure) of the second or third sunroof structure, at least at one of the front and rear end sides of the sliding rails, a height position of the lid sliding rail is lower than that of the shade sliding rail. Further, at a central portion in longitudinal direction, the height position is nearly equal to or higher than that of the shade sliding rail.

The fourth sunroof structure has the following effects in addition to those of the second or third sunroof structure. That is, as seen in a side view, the lid sliding rail is placed under the shade sliding rail at least at one of the front and rear end sides of the sliding rails. At the central portion in the direction, the lid sliding rail is placed nearly at an equal height of or above the shade sliding rail.

Consequently, at the central portion in the direction, that is, in a range in which a light is incident from the roof opening into the vehicle interior, the sunshade is placed nearly at the equal height of or under the sunroof lid. Thus, the sunshade effectively functions as a light shielding member. Further, at least at one of the front and rear end sides of the sliding rails, that is, in the range in which the light is not incident through the sunroof lid and in which the roof trim is disposed in the interior, the lid sliding rails are isolated from the roof panel. A space is defined above each of the lid siding rails.

Hence, drive means, such as a motor, for driving the sunroof lid, and a drive mechanism for transmitting a drive force of the drive means to the sunroof lid can be disposed between the roof panel and at least one of the front and rear end sides of each of the lid sliding rails without any obstacle to the light shielding function when opening. That is, at least a part of the drive means and the drive mechanism are placed at the front or rear end side of each of the lid sliding rails. Thus, as compared with the related art, the sunroof apparatus can be configured in such a way as to reduce the size thereof in the longitudinal direction.

Consequently, even when the roof opening has a size similar to that of the roof opening in the case of the related art, the length in the longitudinal direction of the sunroof apparatus can be decreased in comparison with the length in such a direction of the related art. When the sunroof apparatus can ensure the space of which capacity is similar to that of the space in the related art, the length in the longitudinal direction of the roof opening can be set to a large value.

According to the embodiment (hereunder referred to as a fifth vehicle sunroof structure of the invention) of one of the first to fourth sunroof structures, a height of the lid sliding rail is lower than that of the shade lid sliding rail at a front end side of each of the sliding rails. Further, a front end side of the lid sliding rail is placed under a laterally extending drain groove portion extending laterally at a front edge side of the roof opening.

The fifth sunroof structure has the following effects in addition to those of one of the first to fourth sunroof structures. That is, owing to an arrangement of the front end side of each of the lid sliding rails under the laterally extending drain groove portion, the lid sliding rails can forwardly be extended without changing the position in the direction of the laterally extending drain groove portion.

This enables that the sunroof lid is more forwardly placed, and that the roof opening is enlarged.

According to the embodiment (hereunder referred to as a sixth vehicle sunroof structure) of the fifth vehicle sunroof structure, the sunroof lid comprises a front lid, which is turnable around a front end thereof, and a rear lid, which is slidable in the longitudinal direction, in such a manner that the front lid and the rear lid connect each other, and a lid drive member that engages with the lid sliding rails in such a way as to be movable in the direction, that drives the front lid through a drive mechanism connected to the front lid at a front side of each of the lid sliding rails, and that engages with the rear lid at a rear side of each of the lid sliding rails to thereby drive the rear lid. At least a part of the drive mechanism is disposed under the laterally extending drain groove portion.

The sixth sunroof structure has the following effects in addition to those of the fifth sunroof structure. That is, because at least the part of the drive mechanism is disposed under the laterally extending drain groove portion, the dimension in the longitudinal direction of the sunroof apparatus does not increase, whereas such a dimension increases in the case of, for example, an apparatus in which the drive mechanism is disposed between the laterally extending drain groove portion and the lid sliding rail.

Thus, it is unnecessary to take up a large interior space for installing the drive mechanism. A large vehicle interior space can be ensured.

According to the embodiment (hereunder referred to as a seventh vehicle sunroof structure) of one of the first to sixth sunroof structures, a longitudinal extending drain groove extending in the direction in both left and right edge sides of the roof opening is formed in such a manner as to be integral with the lid sliding rail.

The seventh sunroof structure has the following effects in addition to those of one of the first to sixth sunroof structures. That is, because the longitudinally extending drain groove is formed in such a way as to be integral with the lid sliding rails, the manufacturing cost of the sunroof apparatus, thus, can be reduced.

BRIEF DESCRIPTION OF THE DRAWINGS

FIG. 7 is the part of the side sectional explanatory view of the sunroof structure, illustrating a rear end of each of the sliding rails where the sunroof apparatus is incorporated into the vehicle body.

DETAILED DESCRIPTION OF THE INVENTION

Figure 1:
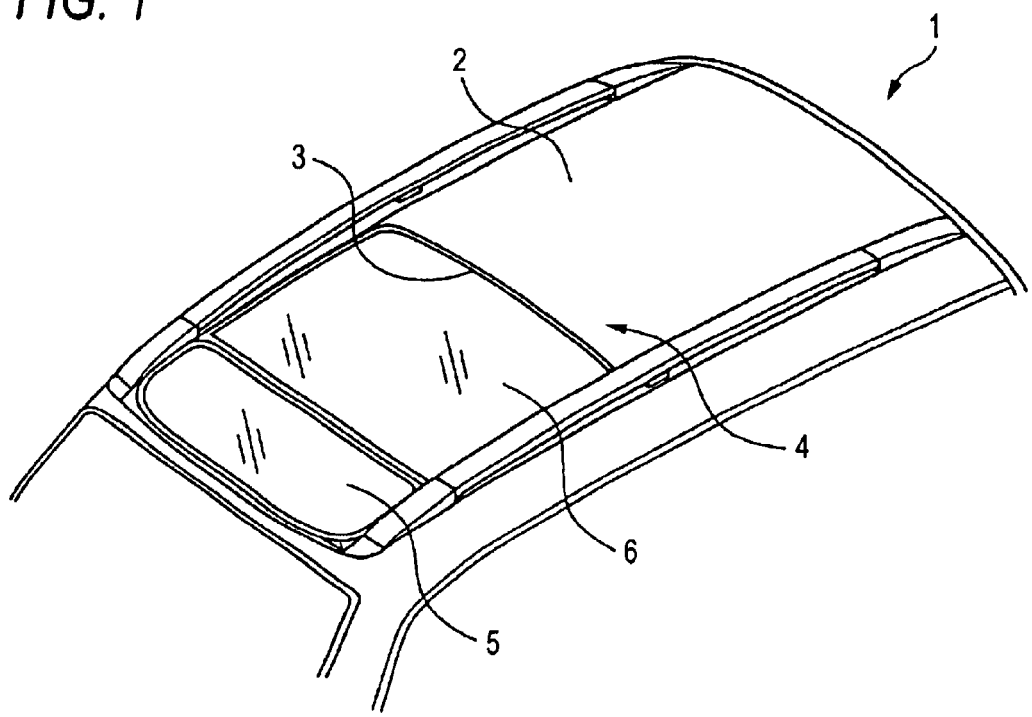
FIG. 1 shows an embodiment of the present invention, and is a perspective view illustrating a roof of a vehicle having a sunroof apparatus, and also illustrating surroundings of the roof.
Figure 2:
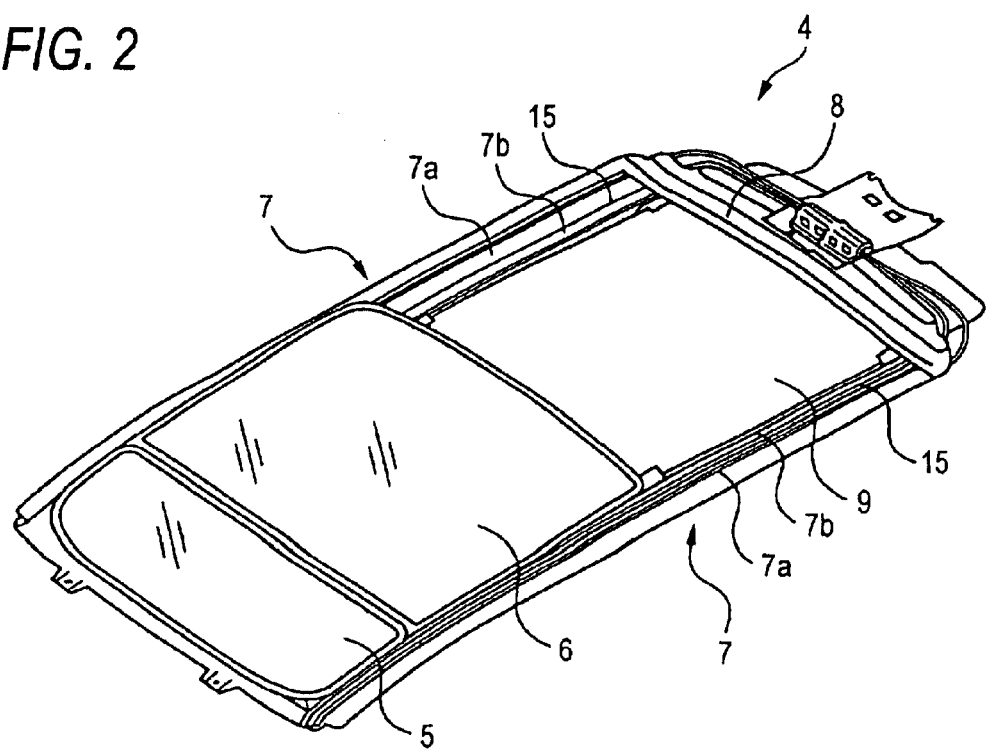
FIG. 2 is the perspective view illustrating the sunroof apparatus when a front lid and a rear lid are closed.
Figure 3:
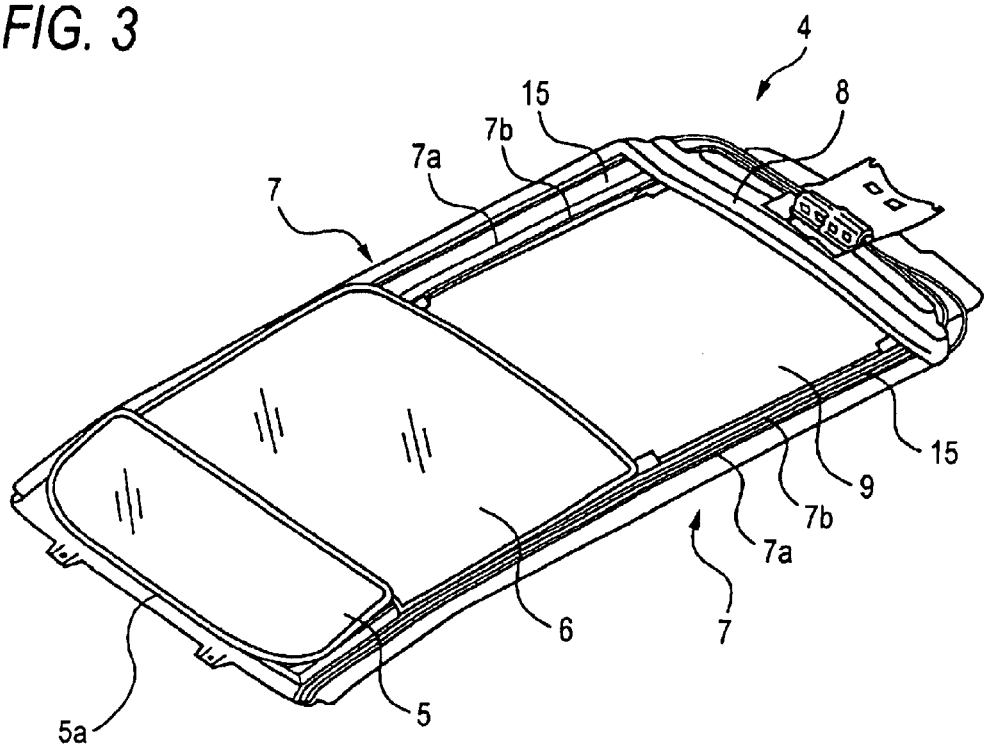
FIG. 3 is the perspective view illustrating the sunroof apparatus where the front lid is partly opened and the rear lid is closed.
Figure 4:
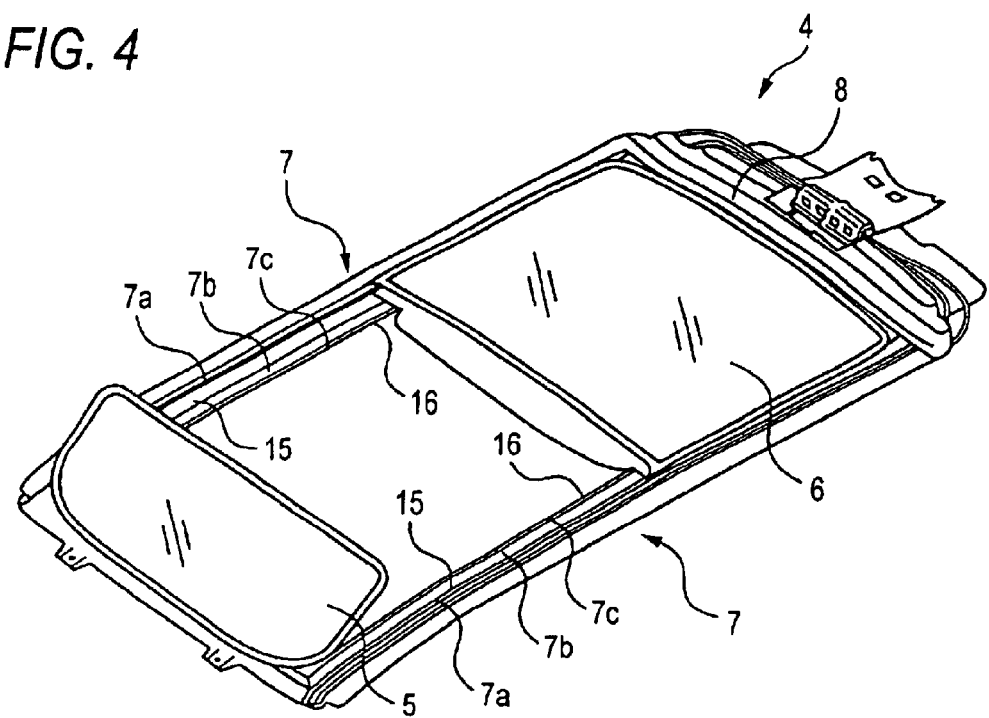
FIG. 4 is the external perspective view illustrating the sunroof apparatus where the front lid and the rear lid are opened.
Figure 5:
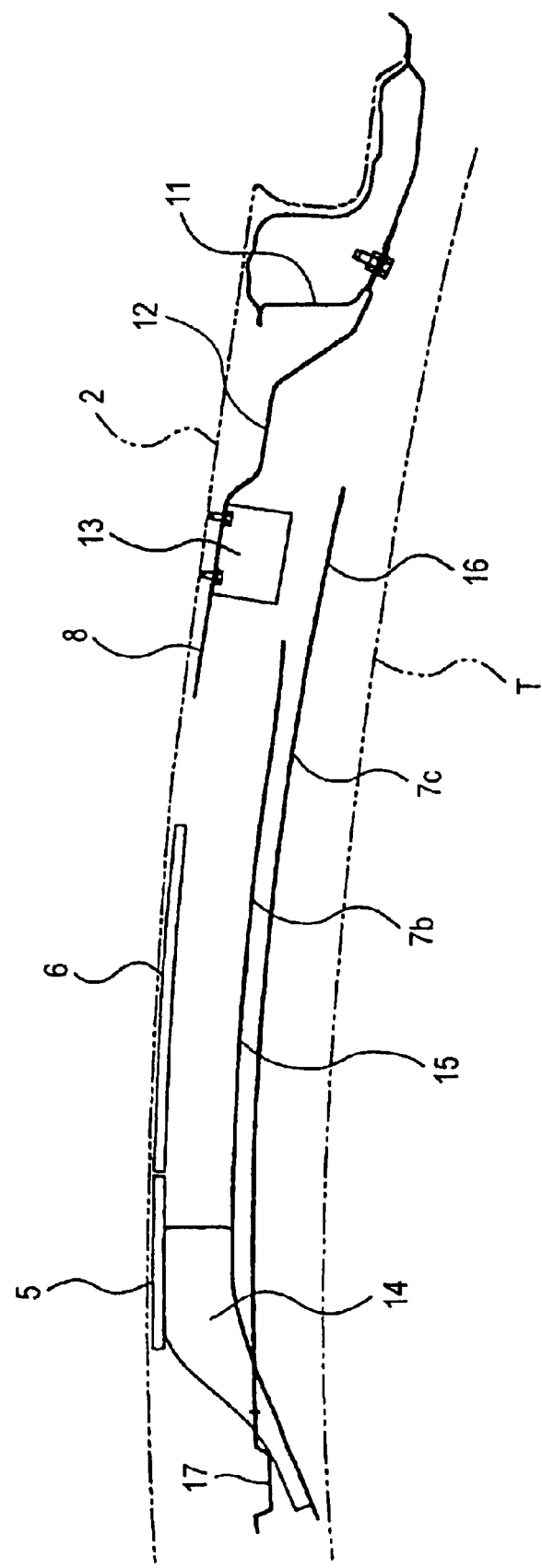
FIG. 5 is a side explanatory view of a sunroof structure, which illustrates a vertically positional relation between sliding rails.
Figure 6:
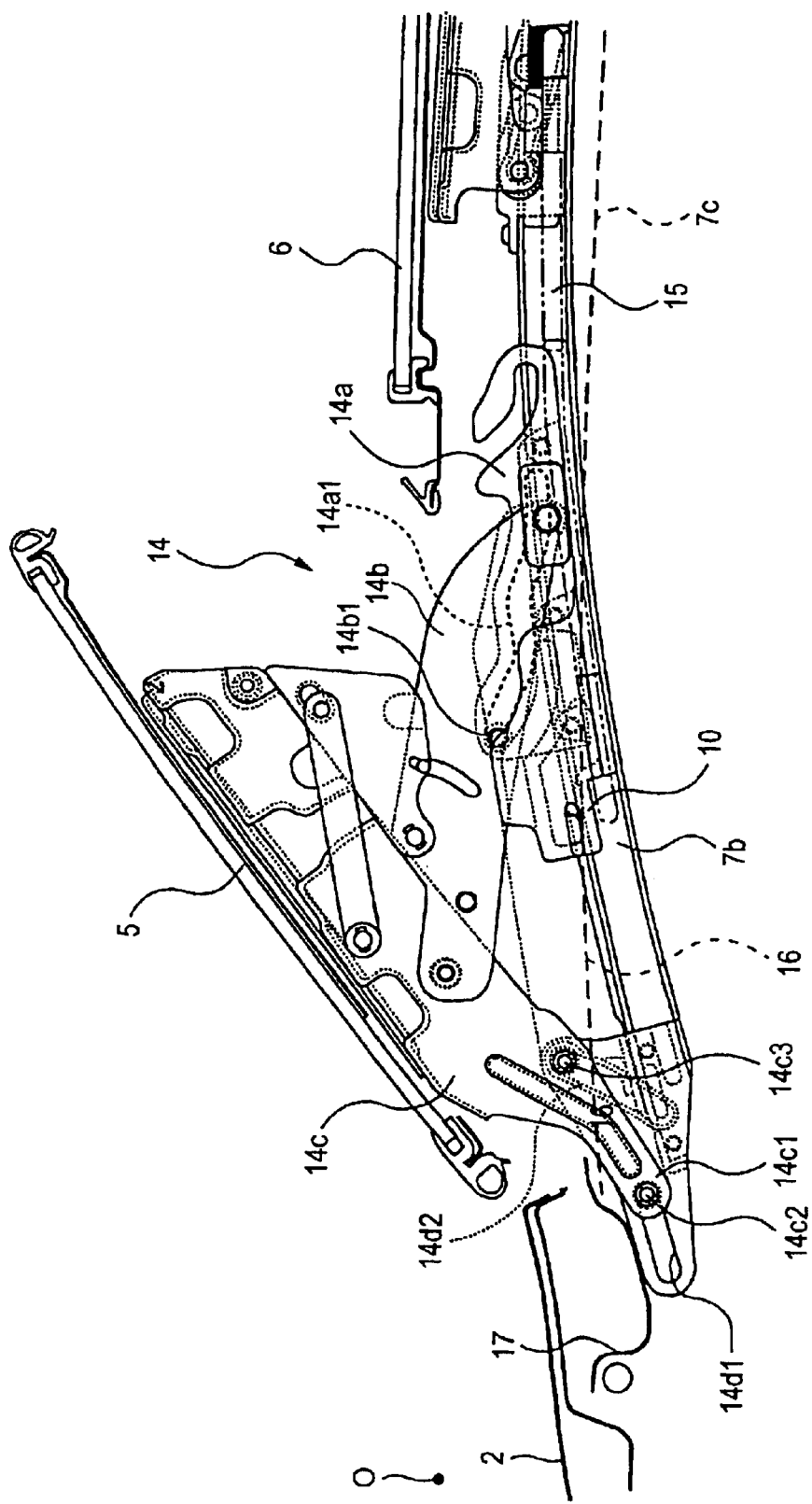
FIG. 6 is a part of a side sectional explanatory view of the sunroof structure, illustrating a front end of each of the sliding rails where the sunroof apparatus is incorporated into a vehicle body.

FIGS. 1 to 7 illustrate an embodiment of the present invention. FIG. 1 is an external perspective view illustrating a roof of a vehicle having a sunroof apparatus, and also illustrating surroundings of the roof. FIG. 2 is an external perspective view illustrating the sunroof apparatus where a front lid and a rear lid are closed. FIG. 3 is the external perspective view illustrating the sunroof apparatus where the front lid is partly opened and where the rear lid is closed. FIG. 4 is the external perspective view illustrating the sunroof apparatus where the front lid and the rear lid are opened. FIG. 5 is a side explanatory view of a sunroof structure, which illustrates a vertically positional relation between sliding rails. FIG. 6 is a partly side sectional explanatory view of the sunroof structure, illustrating a front end of each of the sliding rails where the sunroof apparatus is incorporated into a vehicle body. FIG. 7 is a partly side sectional explanatory view of the sunroof structure, illustrating a rear end of each of the sliding rails where the sunroof apparatus is incorporated into the vehicle body.

As shown in FIG. 1, a motor vehicle 1 is a wagon type. A sunroof apparatus 4 is provided in a roof opening 3 of a roof panel 2. The sunroof apparatus 4 has a rectangular front lid 5 for opening and closing the front side of a roof opening 3, and also has a rear lid 6 for opening and closing the rear side of the roof opening 3 so that the lids 5 and 6 adjoin each other.

As shown in FIG. 2, the front lid 5 is attached to a roof panel 2 in such a way as to be freely turnable around the front side thereof. As shown in FIG. 3, the front lid 5 is configured so that the rear portion thereof is upwardly movable thereby to open the front part of the roof opening 3. Incidentally, in this embodiment, the center of a turn of the front lid 5 is adapted to be slightly moved in a longitudinal direction. As the front end of the front lid 5 rearwardly moves, the rear end thereof upwardly moves.

As shown in FIG. 2, the rear lid 6 is attached to the roof panel 2 in such a way as to slidably movable rearwardly and forwardly. As shown in FIG. 4, the rear lid 6 rearwardly and slidably movable to there by open the rear part of the roof opening 3. In this embodiment, the rear lid 6 is set into an open state after the front lid 5 is set into an open state. Further, the front lid 5 is brought into a closed state after the rear lid 6 is set into a closed state.

As shown in FIG. 2, the sunroof apparatus 4 has a pair of left and right frame portions 7 respectively extending along the left and right peripheral edges of the roof opening 3, and also has a cross member 8 connecting the rear ends of the left and right frame portions 7 to each other. As shown in FIG. 4, in each of the left and right frame portions 7, a longitudinally extending drain groove 7a, lid sliding rails 7b for driving the lids 5 and 6, and shade sliding rails 7c for guiding the sunshade 9 in the longitudinal direction are formed in this order from the left or right outside thereof.

In this embodiment, each of the extending drain grooves 7a and the lid sliding rails 7b is formed in such a manner as to have a concave section. The extending drain groove 7a receives a drain water flowing into a vehicle interior from the peripheral edge of the roof opening 3, and leads the drain water to the outside of the vehicle. Further, a drive member 10 for driving the front lid 5 and the rear lid 6 is arranged on the lid sliding rails 7b. The drive member 10 is moved by a motor 13 installed on the bottom side of a bracket 12 provided in such a way as to hang across the cross member 8 and a rear rail 11 of the vehicle body.

In this embodiment, the drive member 10 moves on the lid sliding rails 7b longitudinally. As shown in FIG. 5, the drive member 10 engages with an engaging member 14a of a drive mechanism 14 for turning the front lid 5 at the front of the lid sliding rail 7b, and also engages with the rear lid 6 at the rear of the lid sliding rail 7b.

The drive member 10 moves longitudinally during a state, in which the drive member 10 engages with the lid 5 or 6, to thereby drive the lids 5 and 6 in such a manner as to open and close. That is, when the drive member 10 moves from the front side to the rear side, the front lid 5 and the rear lid 6 are opened in this order. When the drive member 10 moves from the rear side to the front side, the front lid 6 and the rear lid 5 are closed in this order.

The shade sliding rails 7c are formed like flanges nearly horizontally projecting leftwardly, rightwardly and inwardly. The left and right end portions of the sunshade 9 are forwardly and rearwardly slidably put on the flange-like portions. In this embodiment, the sunshade 9 is operated by the occupant to thereby move longitudinally. Further, as shown in FIG. 5, the roof trim T is placed under the shade sliding rails 7c.

In this embodiment, each of the left and right frame portions 7 is configured by being divided into a lid forming member 15, in which the longitudinally extending drain groove 7a and the lid sliding rail 7b are formed, and a shade forming member 16 in which the shade sliding rail 7c is formed. In this embodiment, the cross member 8 connects the left and right lid forming members 15 and the left and right shade forming members 16, as illustrated in FIG. 4.

Further, as shown in FIG. 5, each of the lid forming member 15 is provided independently from the shade forming member 16. In this embodiment, each of the lid sliding rails 7b and the shade sliding rails 7c is formed by being bent in such a way as to be upwardly convex. Furthermore, each of the lid sliding rails 7b is formed by combining parts respectively having a plurality of radii of curvature. Each of the shade sliding rails 7c is formed from a part having a nearly constant radius of curvatures. As illustrated in FIG. 5, the lid sliding rail 7b and the shade sliding rail 7c are formed on loci differing from each other. As shown in FIG. 6, the lid forming member 15 is formed in such a way as to have a front end side portion, which is longer than that of the shade forming member 16. Moreover, each of the forming members 15 and 16 is configured so that the height position of the lid sliding rail 7b is lower than that of the shade sliding rail 7c at both end sides thereof, and that that of the lid sliding rail 7b is higher than that of the shade sliding rail 7c at a central portion in the longitudinal direction of each of the sliding rails 7b and 7c.

Further, the front end side portion of each of the lid siding rails 7b is disposed under the laterally extending drain groove portion 17 at the front edge side of the roof opening 3. Also, a part of the drive mechanism 14 of the front lid 5 is disposed under the drain groove portion 17. Hereunder, the drive mechanism 14 for the front lid 5 is described.

The drive mechanism 14 has the engaging member 14a engaging with the lid drive member 10. The engaging member 14a is formed like the lid drive member 10 in such a way as to be freely movable longitudinally. The engaging member 14a engages with the lid drive member 10 when the lid drive member 10 is placed in front of the lid sliding rail 7b. Then, the engaging member 14a moves longitudinally together with the lid drive member 10. Incidentally, when the lid drive member 10 moves from the front side to the rear side of the lid sliding rail 7b, the engagement between the lid drive member 10 and the engaging member 14a is cancelled.

Further, the drive mechanism 14 has a turning member 14b turnably provided on each of the lid sliding rails 7b. In this embodiment, the turning member 14b extends in the longitudinal direction and turns around the rear end thereof when the front lid 5 is closed. In this turning member 14b, a pin member 14b1 is provided in such a way as to be inserted through a groove portion 14a1 formed in the engaging member 14a. The groove portion 14a1 has a zone where a corresponding part of the groove portion 14a1 is formed nearly in parallel with the lid sliding rail 7b, and another zone in which a corresponding part thereof is inclined forwardly and upwardly. That is, when the engaging member 14a moves longitudinally together with the lid drive member 10 while the pin member 14b1 moves in the zone in which the corresponding part of the groove portion 14a1 is parallel with the lid sliding rail 7b, the turning member 14b does not turn. Furthermore, when the pin member 14b1 moves in the zone where the corresponding part of the groove portion 14a is inclined, the turning member 14b turns.

Moreover, the drive mechanism 14 has a connecting member 14c fixedly provided in the interior side of the front lid 5 and turnably connected to the front end of the turning member 14b. The connecting member 14c has an extending portion 14c downwardly extending under the laterally extending drain groove portion 17. At the front end side part of this extending portion 14c1, a first pin member 14c2 and a second pin member 14c3, which is disposed behind this first pin member 14c2, are provided. The first pin member 14c2 penetrates through a first insertion groove 14d1 formed under the laterally extending drain groove portion 17 in such a manner as to extend nearly horizontally, and slightly upwardly and rearwardly. Further, the second pin member 14c3 penetrates through a second insertion groove 14d2 extending obliquely and rearwardly upwardly behind the first insertion groove 14d1.

Thus, when the turning member 14b turns and the front end side thereof rises, each of the pin members 14c2 and 14c3 of the connecting member 14c backwardly moves in a corresponding one of the insertion grooves 14d1 and 14d2. Consequently, the connecting member 14c and the front lid 5 turn around the center of a turn O indicated in FIG. 6. Then, the rear end side portions of the connecting member 14c and the front lid 5 rise, so that a part provided in the vicinity of the rear portion of the front lid 5 in the roof opening 3 is opened.

The drive mechanism 14 is structured in this way. Thus, as shown in FIGS. 5 and 6, a part of the drive mechanism 14 is disposed under the laterally extending drain groove portion 17.

Further, as shown in FIG. 7, the motor 13, and the rear rail 11 are placed behind the lid forming member 15. That is, in this embodiment, the motor 13 is disposed behind (that is, at the outer place in the longitudinal direction of) the end portion of the lid sliding rail 7b. Furthermore, the motor 13 is placed above the rear end side of each of the shade forming members 16.

According to the sunroof structure configured as described above, each of the lid forming members 15 is provided independently with no relation to the shade forming members 16. Thus, each of the lid sliding rails 7b is formed separately and independently from the shade sliding rails 7c. The sunroof lids 5 and 6 and the sunshade 9 can be disposed corresponding to the installed state and the formed state of the roof panel 2 and the roof trim T. Consequently, even when the roof panel 2 and the roof trim T are formed independently from each other by putting an importance on the marketability of the vehicle, the sunroof lids 5 and 6 and the sunshade 9 can be disposed without impairing the sense of an unity of the exterior and interior of the vehicle 1.

Further, the sliding rails 7b and 7c are respectively formed on loci different from one another. Thus, the lid sliding rails 7b can be formed on the loci determined according to the size, a shape, an open state of each of the lids 5 and 6, and the shape of the roof panel 2. Moreover, the shade sliding rails 7c can be formed on the loci determined according to the force applied by the occupant for moving the sunshade 9, and the shape of the roof trim T. That is, in the case that the loci respectively corresponding to the sliding rails 7b and 7c are nearly the same, it is difficult for the optimum design of the loci corresponding to the sliding rails 7b and 7c without relation of each other. However, according to the invention, the loci respectively corresponding to the sliding rails 7b and 7c can be formed in the optimum design. Incidentally, because each of the shade sliding rails 7c has a nearly constant radius of the curvature in this embodiment, the force for moving the sunshade 9 can be set a nearly constant value in the longitudinal direction.

Furthermore, the sliding rails 7b and 7c are configured so that the lid sliding rail 7b is placed under the shade sliding rail 7c at the front end side thereof, that the sliding rails intersect with each other at a predetermined place, and that the lid sliding rail 7b is placed above the shade sliding rail 7c at the central portion in the longitudinal direction.

Consequently, at the central portion in the longitudinal direction of each of the sliding rails 7b and 7c, that is, in the range in which the light is incident from the roof opening 3 into the vehicle interior through the lids 5 and 6, the sunshade 9 is placed under lids 5 and 6. Thus the sunshade 9 functions as an effective light shielding member. Further, at the front end side of each of the sliding rails 7b and 7c, that is, in the range in which the light is not incident through the sunroof lid and in which the roof trim T is disposed in the vehicle interior, the lid sliding rails 7b are isolated from the roof panel 2. The space is defined above each of the lid siding rails 7b.

Thus, according to the sunroof structure of the vehicle 1 of this embodiment, the sliding rails 7b and 7c are formed separately of one another. Therefore, the flexibility in forming the roof of the vehicle 1 and the surroundings thereof is drastically improved. Also, the marketability of the vehicle 1 is drastically improved. Further, the roof panel 2 and the roof trim T can be placed so that the gap therebetween is small. The roof trim T can be made to become close to the roof panel 2 within the range in which the sunroof structure has no obstacle to the sunroof function. Consequently, the space in the vehicle can be comfortably increased.

Further, according to the sunroof structure of the vehicle 1 of this embodiment, the sliding rails 7b and 7c are formed on loci differing from one another. Therefore, each of the sliding rails can be adapted to the forming of the roof and surroundings of the vehicle 1, and to the driving and operating states of the sunroof lids 5 and 6 and the sunshade 9. Consequently, the marketability of the vehicle 1 can be more improved.

Furthermore, according to the sunroof structure of the vehicle 1 of this embodiment, the force for moving the sunshade 9 can be nearly at the constant value in the longitudinal direction. Therefore, the sunshade 9 can stably be moved in the longitudinal direction. The occupant can have the comfortable feeling to operate the sunshade 9. The marketability of the vehicle 1 can be more enhanced.

Further, according to the sunroof structure of the vehicle 1 of this embodiment, the space is defined above the front end side of the lid sliding rails 7b without any obstacle to the light shielding function of the sunshade 9, which is performed in the roof opening 3. Part of the drive mechanism 14 can be placed between the front end side portion of the lid sliding rail 7b and the roof panel 2. That is, as compared with the prior arts, the sunroof apparatus 4 can be configured in such a way as to reduce the size thereof in the longitudinal direction.

Consequently, even when the roof opening 3 has the size similar to that of the roof opening in the case of the prior arts, the length in the longitudinal direction of the sunroof apparatus 4 can be decreased in comparison with the length in such a direction of the prior arts. When the sunroof apparatus 4 can ensure the space of which capacity is similar to that of the space in the prior arts, the length in the longitudinal direction of the roof opening 3 can be set to a large value.

Further, according to the sunroof structure of the vehicle 1 of this embodiment, the front end side of each of the lid sliding rails 7b is placed under the laterally extending drain groove portion 17. Thus, the lid sliding rails 7b can forwardly be extended without changing the position in the longitudinal direction of the laterally extending drain groove portion 17.

This enables that the front lid 5 is more forwardly placed, and that the roof opening 3 is enlarged.

Moreover, according to the sunroof structure of the vehicle 1 of this embodiment, at least a part of the drive mechanism 14 is disposed under the laterally extending drain groove portion 17. Thus, the dimension in the longitudinal direction of the sunroof apparatus 4 does not increase, whereas such a dimension increases in the case of, for example, an apparatus in which the drive mechanism is disposed between the laterally extending drain groove portion and the lid sliding rail. Therefore, it is unnecessary to occupy a large interior space for installing the drive mechanism 14. Large interior space can be ensured in the vehicle 1.

Furthermore, according to the sunroof structure of the vehicle 1 of this embodiment, the longitudinally extending drain groove 7a extending in the longitudinal direction in both left and right edge sides of the roof opening 3 is formed in such a manner as to be integral with the lid sliding rail. Therefore, not only the manufacturing cost of the sunroof apparatus 4 but also that of the vehicle 1 can be reduced.

Further, according to the sunroof structure of the vehicle 1 of this embodiment, the lid sliding rail 7b is formed in such a way as to be elongated forwardly of the shade sliding rail 7c. Furthermore, the part of the drive mechanism 14 is placed forwardly of the shade sliding rail 7c. Thus, the dimension in the longitudinal direction of the sunroof apparatus 4 does not become large. It is unnecessary to occupy the large interior space for installing the drive mechanism 14. Consequently, a large vehicle interior space can be ensured.

Incidentally, although it is described in the foregoing description of the embodiment that the front lid 5 is adapted to turn, and that the rear lid 6 is adapted to slide, each of the lids 5 and 6 may be either of the turning type or of the sliding type.

Further, although it is described in the foregoing description of the embodiment that the height position of the lid sliding rail 7b is lower than the height position of the shade sliding rail 7c at the front end side portion of each of the sliding rails 7b and 7c, the height position of the lid sliding rail 7b may be lower than the height position of the shade sliding rail 7c at the rear end side portion or at both front and rear portions of each of the sliding rails 7b and 7c.

Moreover, although it is described in the foregoing description of the embodiment that the height position of the lid sliding rail 7b is higher than the height position of the shade sliding rail 7c at the central portion in the longitudinal direction of each of the sliding rails 7b and 7c, advantages similar to those of the aforementioned embodiment can be obtained even when the height position of the lid sliding rail 7b is nearly equal to the height position of the shade sliding rail 7c at the central portion in the longitudinal direction.

Furthermore, although it is described in the foregoing description of the embodiment that the part of the drive mechanism 14 is disposed under the laterally extending drain groove portion 17, the entire drive mechanism 14 maybe disposed thereunder.

Additionally, the configuration of the drive mechanism 14 of the aforementioned embodiment is optional. Other practical details of the structure can suitably be changed.

As described in detail above, according to the vehicle sunroof structure of the present invention, the flexibility in forming the vehicle roof and surroundings thereof is drastically improved. Moreover, the marketability of the vehicle is drastically improved. Further, the roof panel and the roof trim can be placed so that the gap therebetween is small. The roof trim can be made to become close to the roof panel within the range in which the vehicle sunroof structure has no obstacle to the sunroof function. Consequently, the space in the vehicle can be increased.

What is claimed is:

1. A sunroof structure comprising:
   lid sliding rails respectively formed on left and right sides of a roof opening in such a way as to extend in a longitudinal direction so as to guide sunroof lids; and
   shade sliding rails respectively formed on the left and right sides of the roof opening in such a manner as to extend in said direction,
   wherein both of said lid and shade sliding rails are respectively and separately formed on different loci from one another,
   a height position of the lid sliding rail is lower than that of the shade sliding rail at least at one of front and rear end sides thereof, and
   the lid sliding rail has a height position at a central portion in said longitudinal direction nearly equal to or higher than that of the shade sliding rail.

2. A sunroof structure comprising:
   lid sliding rails respectively formed on left and right sides of a roof opening in such a way as to extend in a longitudinal direction so as to guide sunroof lids; and
   shade sliding rails respectively formed on the left and right sides of the roof opening in such a manner as to extend in said direction,
   wherein both of said lid and shade sliding rails are respectively and separately formed, a height position of the lid sliding rail is lower than that of the shade sliding rail at a front end side of each of the sliding rails, and a front end side of the lid sliding rail is placed under a laterally extending drain groove portion extending laterally at a front edge side of the roof opening.

3. The sunroof structure according to claim 2, wherein the sunroof lid comprises:

a front lid being turnable around a front end thereof and a rear lid being slidable in the longitudinal direction in such a manner that the front lid and the rear lid are connected to each other;

a lid drive member engaged with the lid sliding rails in such a way as to be movable in the longitudinal direction for driving the front lid through a drive mechanism connected to the front lid at a front side of each of the lid sliding rails and for engaging with the rear lid at a rear side of each of the lid sliding rails so as to thereby drive the rear lid; and at least a part of the drive mechanism being disposed under the laterally extending drain groove portion.

4. The sunroof structure according to claim 1, further comprising a lid forming member extending in the longitudinal direction in each of left and right edge sides of the roof and in which a longitudinally extending drain groove and the lid sliding rail are formed.

5. The sunroof structure according to claim 1, wherein each of the lids is a turning type.

6. The sunroof structure according to claim 1, wherein each of the lids is a sliding type.

7. The sunroof structure according to claim 2, further comprising a lid forming member extending in the longitudinal direction in each of left and right edge sides of the roof and in which a longitudinally extending drain groove and the lid sliding rail are formed.

8. The sunroof structure according to claim 2, wherein each of the lids is a turning type.

9. The sunroof structure according to claim 2, wherein each of the lids is a sliding type.

* * * * *